US011793344B1

United States Patent
Cao et al.

(10) Patent No.: US 11,793,344 B1
(45) Date of Patent: Oct. 24, 2023

(54) APPARATUS FOR SANITARY AND CONTROLLED DISPENSING OF FOOD PRODUCTS

(71) Applicant: Au Cao, Inc., San Marino, CA (US)

(72) Inventors: Trang N. Cao, Burbank, CA (US); Chi H. Cao, Huntington Beach, CA (US)

(73) Assignee: Au Cao, Inc., San Marino, CA (US)

( * ) Notice: Subject to any disclaimer, the term of this patent is extended or adjusted under 35 U.S.C. 154(b) by 0 days.

(21) Appl. No.: 18/350,199

(22) Filed: Jul. 11, 2023

Related U.S. Application Data

(60) Provisional application No. 63/399,451, filed on Aug. 19, 2022.

(51) Int. Cl.
*A47J 9/00* (2006.01)

(52) U.S. Cl.
CPC .................................... *A47J 9/00* (2013.01)

(58) Field of Classification Search
CPC ........ A47J 9/00; A47J 9/001; A47J 2009/008; A47J 9/003; A47J 9/005
USPC ........................... 401/12, 131, 202, 213, 269
See application file for complete search history.

(56) References Cited

U.S. PATENT DOCUMENTS

| 2,589,000 | A | * | 3/1952 | Vani | ...................... | A47G 21/005 |
| | | | | | | 401/12 |
| 3,362,777 | A | * | 1/1968 | Keshock | .............. | A47G 19/303 |
| | | | | | | 401/12 |
| 4,544,083 | A | * | 10/1985 | Schroeder | ................. | A47J 9/00 |
| | | | | | | 401/175 |
| 4,964,745 | A | * | 10/1990 | Deitz | ..................... | A47G 19/26 |
| | | | | | | 401/12 |
| 9,596,953 | B1 | | 3/2017 | Krumpe | | |

OTHER PUBLICATIONS

Fox Run, "Fox Run Butter Spreader with Built-In Cover, Plastic", Dec. 24, 2008, https://www.amazon.com/Fox-Run-5416-Spreader-Plastic/dp/B000I1Y2PK/ref=cm_cr_arp_d_product_top?ie=UTF8.
Lanjilife, "Handy Butter Spreader Dispenser Hard Sticks Holders Plastic Storage Case Small Kitchen Baking Tools Convenient Butter Keeper Box", Apr. 14, 2021, https://www.amazon.com/Spreader-Dispenser-Holders-Plastic-Convenient/dp/B091TWFB3Y.
(Continued)

*Primary Examiner* — David J Walczak
(74) *Attorney, Agent, or Firm* — Ansari Katiraei LLP; Arman Katiraei; Sadiq Ansari

(57) ABSTRACT

An apparatus for sanitary and controlled dispensing of a butter stick or another food product having a rectangular stick form. The apparatus includes a dispensing housing, a coupler, a base, and a cover. The dispensing housing includes a rectangular body with a central cavity, an elongated opening about a first side of the rectangular body, and a pair of grippers about a second side and a third side of the rectangular body adjacent to the first side. The coupler is attached to a bottom of the dispensing housing. The coupler includes a flexible material that increases a width about the bottom of the dispensing housing. The base couples to and decouples from the bottom of the dispensing housing via the coupler. The cover couples to and decouples from a top of the dispensing housing via the coupler.

16 Claims, 5 Drawing Sheets

(56) References Cited

OTHER PUBLICATIONS

Fusion Brands, "FusionBrands ButterEasy Butter Spreader and Butter Stick Holder—The Simple Way to Spread Butter—Easily Spread Butter on Cookware, Baking Dishes, Corn, Toast and Other Warm Foods", Mar. 21, 2018, https://www.amazon.com/Fusionbrands-8127-ButterEasy-Butter-Spreader/dp/B07C8VCCVX.

Tovolo, "Tovolo Sleeve-Silicone Gadget for Kitchen Cooking, Serving, Grilling, BBQ, & Smoker/Mess-Free Butter Dispenser, (Yellow/White)", Aug. 30, 2016, https://www.amazon.com/Tovolo-Silicone-Mess-Free-Application-Dishwasher/dp/B01L9PEUK0?th=1.

Butter Boy, "Talisman Designs Butter Boy Butter Keeper & Spreader, Green", Feb. 13, 2005, https://www.amazon.com/Talisman-Designs-BB-G-Butter-Green/dp/B000GLNNES/ref=pd_di_sccai_2/141-6098356-4614304?pd_rd_w=OEUJs&pf_rd_p=c9443270-b914-4430-a90b-72e3e7e784e0&pf_rd_r=PRYDZ74RWCV6NC882QE3&pd_rd_r=809320bb-5658-4563-a855-d9e94f6b52d0&pd_rd_wg=ak8u9&pd_rd_i=B000GLNNES&th=1.

ButterPOP, "ButterPOP No Mess Holder & Dish to Spread Butter on Warm Pans & Food, Clear, Black", May 11, 2022, https://www.amazon.com/ButterPOP-Holder-Spread-Butter-Clear/dp/BOB133JJ3D/ref=sr_1_1?crid=2H32VUGNJ7EVC&keywords=ButterPOP&qid=1686074750&s=home-garden&sprefix=butterpop, garden, 160&sr=1-1.

Butter Boss, "Butter Boss", Jun. 19, 2017, https://www.amazon.ca/Butter-Boss-G-BBY-BL/dp/B072K3SSVN.

Amelia Roblin, "The Butter Boss Dispenses Measured Proportions for Healthier Meals", Apr. 26, 2013, https://www.trendhunter.com/trends/butter-boss.

Rluii, "Rluii One Click Stick Butter Cutter/Butter Cheese Cutter/Stainless Blade Slice/Dispenser/Slicer/Cutter/Butter Dispenser/Butter Gadgets", Nov. 6, 2018, https://www.amazon.com/Butter-Cutter-Stainless-Dispenser-Gadgets/dp/B07K7QST9W/ref=psdc_13162311_t3_B09CT51F39.

KitchenArt, "KitchenArt Buttermate Butter Cutter Slicer, Measuring Dispenser and Keeper, White", Oct. 2, 2001, https://www.amazon.com/Kitchen-Art-32000-KitchenArt-Buttermate/dp/B00020O3YC/ref=asc_df_B00020O3YC/?tag=hyprod-20&linkCode=df0&hvadid=198094063648&hvpos=&hvnetw=g&hvrand=14277085950201248004&hvpone=&hvptwo=&hvqmt=&hvdev=c&hvdvcmdl=&hvlocint=&hvlocphy=9031194&hvtargid=pla-318190364346&psc=1.

Butter Baron, "Butter Everything with the Revolutionary Butter Spreader!", 2020, https://www.butter-baron.com/.

Monkey Business, "Monkey Business Spredo-Butter Spreader and Salt Shaker, Yellow", Jan. 18, 2015, https://www.amazon.com/Monkey-Business-MB865-Spredo-butter-Spreader/dp/B00SEFCZ92/ref=sr_1_1?crid=321XMVHAT33Z4&keywords=SPREDO&qid=1689019872&sprefix=spredo%2Caps%2C1080&sr=8-1.

Butter Crayon, "Butter Crayon Brand Dispenser", 2023, https://buttercrayon.com/.

\* cited by examiner

APPARATUS FOR SANITARY AND CONTROLLED DISPENSING OF FOOD PRODUCTS

CLAIM OF BENEFIT TO RELATED APPLICATIONS

This application claims the benefit of U.S. provisional application 63/399,451 entitled "A Butter stick Holder and Dispenser.", filed Aug. 19, 2022. The contents of application 63/399,451 are hereby incorporated by reference.

BACKGROUND

Butter and other food products (e.g., margarine, cheeses, etc.) may come in the form of a generally rectangular stick. A knife or other cutting tool is used to cut into the product and cut away a desired amount of the food product. The cut portion may be placed onto a cooking surface or onto another food item.

In the case of butter, users may want to directly apply some amount of the butter to the cooking surface or food item without the use of knives or the cutting and transferring of a portion of the butter. Accordingly, butter stick holders and dispensers have been designed for the direct application of butter to the cooking surface and/or food item.

Some existing designs require direct contact between the user's hand or fingers and the butter which creates sanitary and food safety concerns over prolonged usage of the butter. Moreover, the direct contact may cause the butter to deform when uneven pressure is applied to dispense the butter.

Other designs use gear or twist mechanisms to dispense the butter so that the user does not directly contact the butter. These designs complicate usage by requiring the butter to first be attached to the gear or twist mechanism, and by requiring the user to perform unnatural and inefficient movements to dispense the butter.

DETAILED DESCRIPTION OF PREFERRED EMBODIMENTS

The following detailed description refers to the accompanying drawings. The same reference numbers in different drawings may identify the same or similar elements.

Disclosed is an apparatus for sanitary and controlled dispensing of food products with a solid rectangular form. The food product may be inserted into the apparatus, and the apparatus may provide an applicator that dispenses the food product onto a cooking surface or another food item without the user's finger directly contacting the dispensed product. While the apparatus is described in connection with the dispensing of butter, it should be understood that other food products such as margarine or cheese may be dispensed using the apparatus of the present invention.

As will be seen in the accompanying drawings, the dispensing apparatus includes a housing and one or more covers that prevent one's fingers from contacting the hot surface while directly dispensing or applying the butter onto the hot surface. The housing and one or more covers also fully cover the butter or other food product when not in use. The apparatus is designed for single-handed use, and for single finger dispensing of a measured amount or all of the food product in a single motion.

Figure 1:
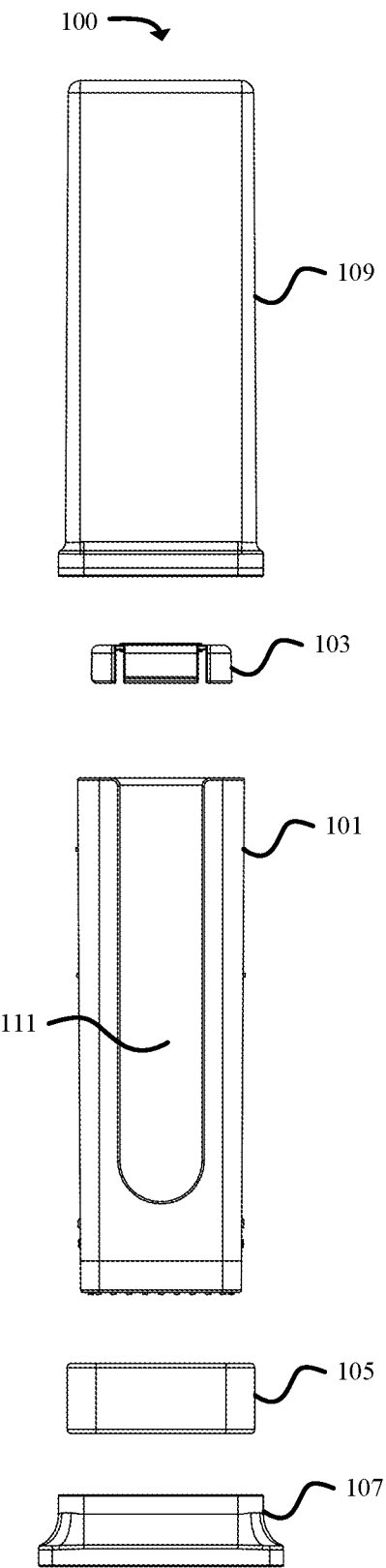
FIG. 1 provides a front exploded view of a dispensing apparatus in accordance with some embodiments presented herein.
Figure 2:
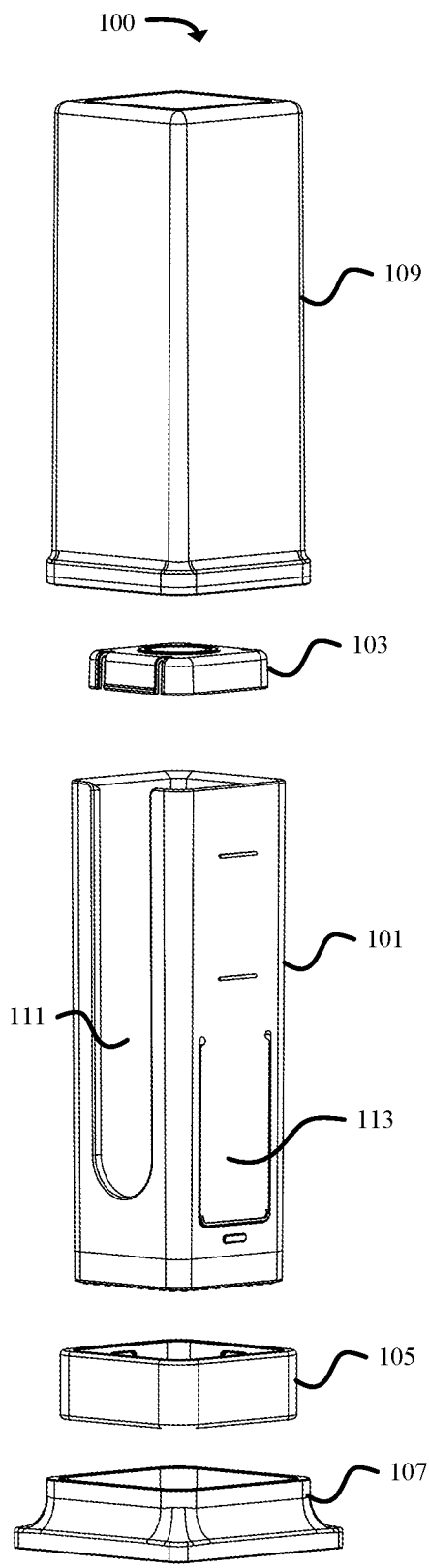
FIG. 2 provides a perspective exploded view of the dispensing apparatus in accordance with some embodiments presented herein.

FIG. 1 provides a front exploded view of dispensing apparatus 100 in accordance with some embodiments presented herein. FIG. 2 provides a perspective exploded view of dispensing apparatus 100 in accordance with some embodiments presented herein.

Dispensing apparatus 100 includes dispensing housing 101, cap 103, coupler 105, base 107, and cover 109. In some embodiments, dispensing apparatus 100 may include more or less components. For instance, coupler 105 may be omitted from dispensing apparatus 100. In some embodiments, two or more of the components may be integrated. For instance, coupler 105 and dispensing housing 101 may be molded or manufactured as a single component.

In some embodiments, dispensing apparatus 100 and its components may be manufactured with an injection molding process or three-dimensional printing process. The injection molding process may apply heat and pressure to plastics or other materials in order to generate the components (e.g., dispensing housing 101, cap 103, coupler 105, base 107, and cover 109) with the desired shape and dimensionality. The components may be composed of a Polylac® resin, Acrylonitrile-Butadiene-Styrene Copolymer, and/or other plastic or silicon compositions that are food-grade and high heat tolerant (e.g., have a melting point that is greater than 500 degrees Fahrenheit).

Dispensing housing 101 may have a rigid rectangular body with elongated opening 111 on one side of dispensing housing 101 (e.g., a front face of dispensing housing) and grippers 113 that are integrated about opposite sides of dispensing housing 101 adjacent to the side or surface of dispensing housing 101 with elongated opening 111 (e.g., left and right sides of dispensing housing 101). The cavity within dispensing housing 101 is sized to accommodate butter sticks and/or other food products with rectangular shapes of different lengths, widths, and/or sizes. For instance, dispensing housing 101 may be 3-9 inches tall and 1-2 inches wide. In other words, dispensing housing 101 is sized to be slightly larger than common sticks of butter. Butter sticks that are smaller in width and/or depth than the cavity within dispensing housing 101 may still be dispensed in a controlled and measured manner using one or more fingers that are positioned over elongated opening 111 and that apply pressure to grippers 113.

The top and bottom of dispensing housing 101 are open. Elongated opening 111 extends from the top end of dispensing housing 101 (e.g., the end where the butter stick is inserted into dispensing housing 101) towards a bottom end of dispensing housing 101 (e.g., the end where the butter stick is dispensed). Elongated opening 111 may terminate before the bottom end of dispensing housing 101 with a U-shape or other curved shape as shown, or may extend further along the surface of dispensing housing 101. Elongated opening 111 provides an aperture through which a user finger may contact one end of a butter stick disposed within the dispensing housing 101 with or without cap 103 in between the user finger and the butter stick. A natural downward movement of the user finger through elongated opening 111 pushes the butter stick down through the bottom of dispensing housing 101.

The inclusion of elongated opening 111 allows dispensing apparatus 100 to do away with complicated and inefficient gear or twist mechanisms for dispensing the butter stick, and provides a structure that works with the natural movement of the user finger. For instance, in the absence of elongated opening 111, a user finger would have to poke and push the butter stick through only the top opening of dispensing housing 101. However, with the inclusion of elongated opening 111 about a particular side of dispensing housing 101, the user finger moves freely along that particular side from the top to the bottom of dispensing housing 101.

Grippers 113 include partially cut sections about the left and right sides of dispensing housing 101 adjacent to the side with elongated opening 111. Grippers 113 are tabs or flaps that are attached at one end to dispensing housing 101, and that may be pushed about an opposite end inwards towards the cavity of dispensing housing 101. When pushed inwards, grippers 113 contact the butter stick disposed in dispensing housing 101, retain the position of the butter stick within the dispensing housing 101 with friction and/or sideways contact, and prevent further movement of the butter stick within dispensing housing 101. When no pressure is applied to grippers 113, grippers 113 flex back to being flush or parallel with the rectangular body about the left and right sides of dispensing housing 101 which allows the butter stick to move more freely up and down within the cavity of dispensing housing 101.

Accordingly, the position of the butter stick within dispensing housing 101 and the amount of the butter stick that is exposed or dispensed from the bottom of dispensing housing 101 may be controlled using elongated opening 111 and grippers 113. Specifically, a first user finger may move down through elongated opening 111 in order to push the butter stick through the bottom of dispensing housing 101, and when a desired amount of the butter stick is exposed through the bottom opening, two fingers may be used to push grippers 113 inwards against the butter stick inside dispensing housing 101 and retain the position of the butter stick.

Figure 3:
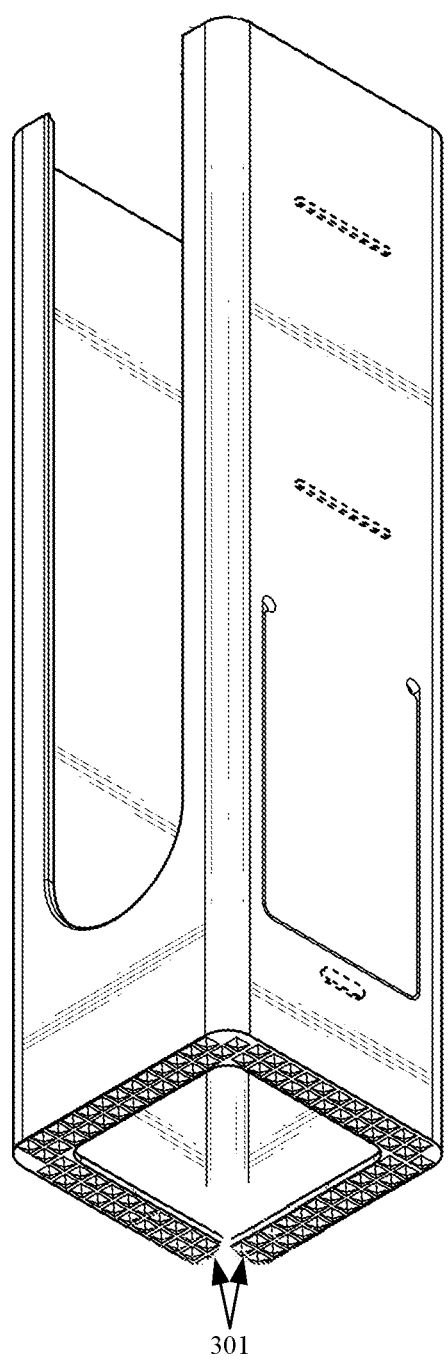
FIG. 3 provides a perspective bottom view of the dispensing housing to illustrate a perforated cutting element in accordance with some embodiments presented herein.

In some embodiments, the bottom of dispensing housing includes a perforated cutting element. FIG. 3 provides a perspective bottom view of dispensing housing 101 to illustrate perforated cutting element 301 in accordance with some embodiments presented herein.

Perforated cutting element 301 includes a set of sharp or pointed edges that extend around the base of dispensing housing 101. Perforated cutting element 301 provides a cutting surface against which the wrapper covering the exposed end of the butter stick may be easily removed. For instance, a user may insert a wrapped butter stick into dispensing housing 101. The wrapper may keep the butter stick from sticking to the inner walls of dispensing housing 101, and may prevent the butter stick from contacting any contaminants (e.g., bacteria, germs, etc.) about the inner walls of dispensing housing 101. The user pushes a portion of the wrapped butter stick through the bottom of dispensing housing 101 past perforated cutting element 301 using elongated opening 111 and grippers 113. The user may peel away the wrapper from the exposed portion, and may use the set of sharp or pointed edges of perforated cutting element 301 to tear, detach, or remove the peeled wrapper from the butter stick.

In some embodiments, perforated cutting element 301 is injection molded as part of dispensing housing. In some other embodiments, perforated cutting element 301 is a blade that is integrated or attached to the base of dispensing element.

Referring back to FIGS. 1 and 2, cap 103 is a rigid plastic component that may be used to avoid direct contact between the user finger and the top end of the butter stick. The dimensions of cap 103 match the dimensions of the cavity within dispensing housing 101. Cap 103 may be flat or may contain a central groove that accommodates the shape of a user finger. In some embodiments, cap 103 may include a downward extending border or skirt that fits over the top end of the butter stick.

Cap 103 may be used to evenly apply pressure over the top end of the butter stick. When butter softens, an uneven application of pressure (e.g., a user finger pressing down on one part but not other parts about the top end of the butter stick) may cause the butter to deform and be dispensed unevenly. However, with cap 103 placed over the top end of the softened butter, the force from the user finger is evenly distributed across the top end of the butter stick which causes the softened butter to be dispensed evenly without deforming about the bottom end of dispensing housing 101.

Coupler 105 may include a heat tolerant silicone piece that fits over or that is integrated to the bottom of dispensing housing 101. Coupler 105 provides a flexible material that is attached about the bottom and over the exterior of dispensing housing 101. Coupler 105 increases the width about the bottom of dispensing housing 101.

Coupler 105 may shield dispensing apparatus 100 and dispensing housing 101 from melting when the butter dispensed from dispensing apparatus 100 is applied directly to a hot surface (e.g., a griddle or frying pan) and the bottom of dispensing housing 101 makes contact with the hot surface. Specifically, coupler 105 provides a heat tolerant barrier between the contacted hot surface and the bottom of dispensing housing 101. Coupler 105 also protects the user's fingers and/or hand from burns when directly applying the dispensed butter to a hot surface. Specifically, coupler 105 creates an outward protrusion about the bottom of dispensing apparatus 100 that prevents the user's fingers from sliding down to the bottom that makes contact with the hot surface, and prevents heat transfer from the hot surface to the dispensing housing 101.

Coupler 105 may also provide a protrusion that serves as a stopping point for the user finger during the dispensing process if elongated opening 111 extends closer to the bottom of dispensing housing 101. The protrusion prevents the user finger from moving closer towards a heat source or hot surface against which the bottom of dispensing housing 101 is oriented.

Coupler 105 also joins base 107 and cover 109 to dispensing housing 101. In doing so, the butter stick within dispensing housing 101 becomes covered on all sides, thereby preventing contamination of the butter when dispensing apparatus 100 is not in use. In some embodiments, attaching base 107 and cover 109 to dispensing housing 101 with coupler 105 creates an air-tight seal that keeps the butter fresher for longer periods of times.

Base 107 is a cover for the bottom of dispensing housing 101, and may serve as a stand to retain dispensing apparatus 100 in a vertical position when not in use. Base 107 includes a top end with an upward extending border that fits around and/or attaches to a bottom portion of coupler 105, and a wider bottom end for added stability when retaining dispensing apparatus in a vertical position. Specifically, coupler 105 may squeeze into the top border of base 107, thereby sealing or covering the bottom of dispensing housing 101. To reuse dispensing apparatus 100, the user simply lifts dispensing apparatus 100 and removes base 107 from coupler 105 by pulling base 107 off coupler 105.

Cover 109 has a rectangular body that is slightly larger than the rectangular body of dispensing housing 101. Cover 109 slides over dispensing housing 101 and fits around and/or attaches to a top portion of coupler 105 in order to seal or cover the top of dispensing housing 101 and/or the butter stick. Cover 109 may include a central cavity, a bottom opening that is sized proportionate to dispensing housing 101, and a bottom lip that is wider than the top of cover 109 and that is sized to fit over and connect to coupler 105. In some embodiments, an air-tight seal is formed when cover 109 and base 107 are connected to coupler 105. The butter or other food product within dispensing housing 101 is no longer exposed to the outer or external environment.

Figure 4:
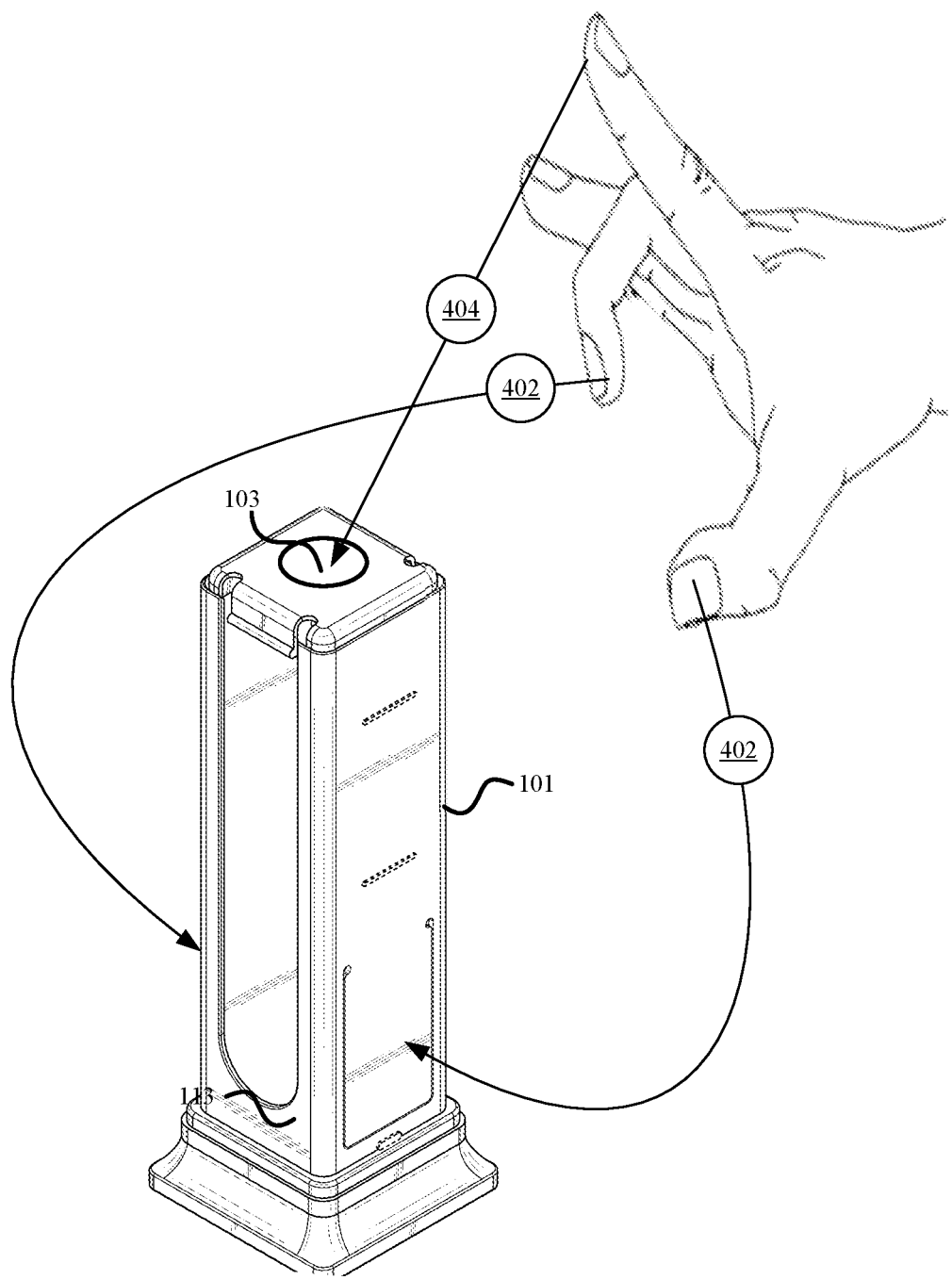
FIG. 4 illustrates an example of dispensing a controlled amount of butter from the dispensing apparatus in accordance with some embodiments presented herein.

FIG. 4 illustrates an example of dispensing a controlled amount of butter from dispensing apparatus 100 in accordance with some embodiments presented herein. As shown in FIG. 4, a butter stick is placed inside dispensing housing 101 from the open top of dispensing housing 101.

The user places cap 103 on the top of dispensing housing 101 and/or over the top of the butter stick. The thumb and the middle finger are placed (at 402) over grippers 113, and the index finger is placed (at 404) over cap 103.

The thumb and the middle finger press grippers 113 against the butter stick to prevent the butter stick from sliding out dispensing housing 101 when the butter stick is narrower than the cavity within dispensing housing 101, or to control the movement of the butter stick inside dispensing housing 101. The index finger pushes down on cap 103 in combination with less pressure being applied to grippers 113 to slide a desired amount of the butter stick out the bottom of dispensing housing 101.

Once the correct amount of the butter stick is exposed out the bottom of dispensing housing 101, the thumb and the middle finger may exert greater force on grippers 113 to prevent further movement of the butter stick. If the exposed end of the butter stick is wrapped, the user may use their other hand to peel away the wrapper against perforated cutting element 301.

The thumb and the middle finger may be used to move dispensing apparatus 100 with the exposed end of the butter stick over a cooking surface or food item, and may be used to rub the exposed end of the butter stick against the cooking surface or food item. The rubbing action distributes the measured amount of butter represented by the exposed end of the butter stick onto the cooking surface or food item.

The user may return dispensing apparatus 100 with the remaining butter stick to base 107, thereby capping the bottom end of dispensing apparatus 100. The user places cover 109 over the top end of dispensing apparatus 100 in order to seal all sides of dispensing apparatus 100 and the remaining butter stick.

Figure 5:
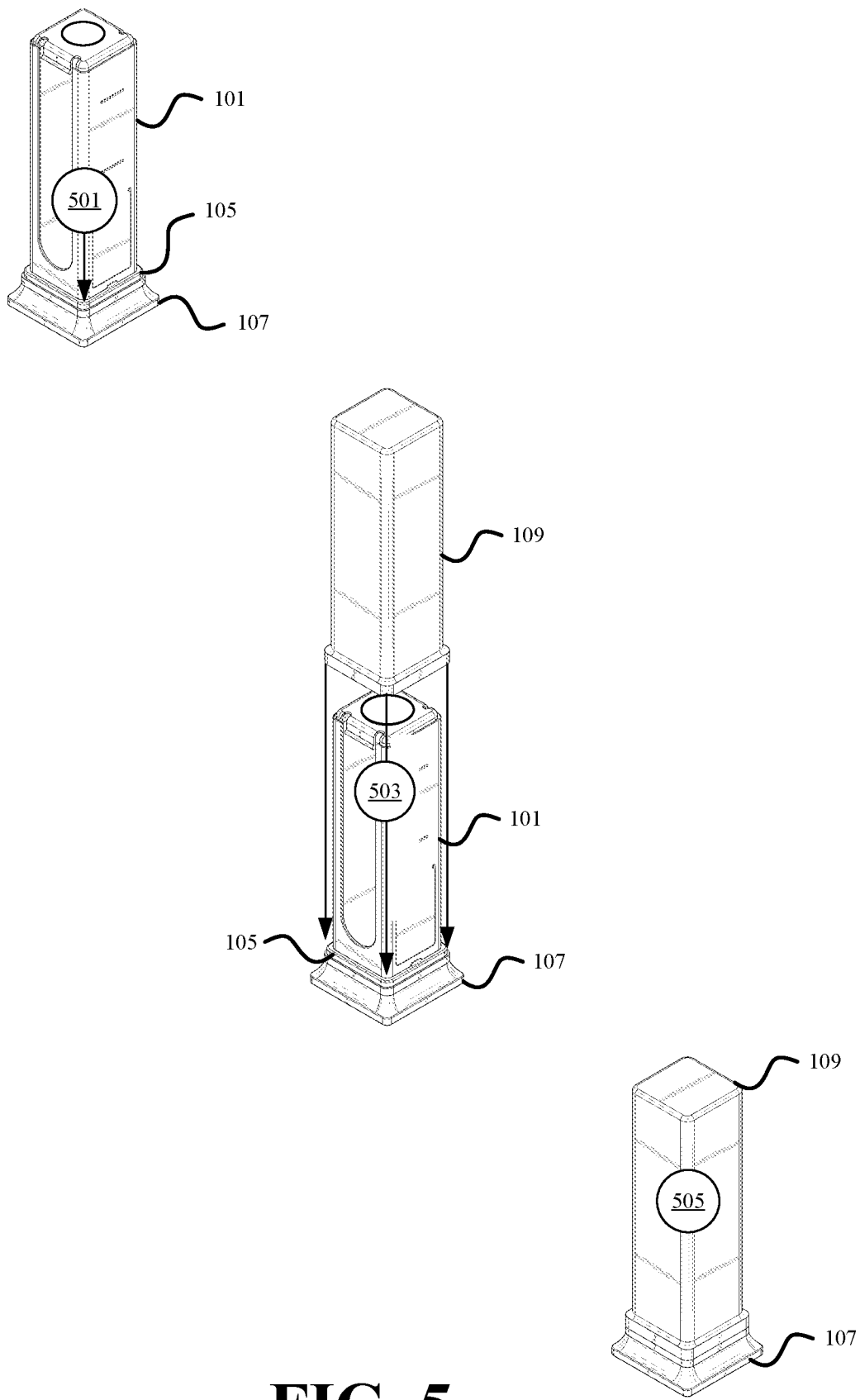
FIG. 5 illustrates sealing the dispensing apparatus with a base and a cover in accordance with some embodiments presented herein

FIG. 5 illustrates sealing dispensing apparatus 100 with base 107 and cover 109 in accordance with some embodiments presented herein. Dispensing apparatus 100 is first placed over base 107. Specifically, coupler 105 about the bottom end of dispensing housing 101 is pushed into the top opening of base 107. This action connects or couples dispensing housing 101 to base 107, and seals the bottom end of dispensing apparatus 100. Reference marker 501 illustrates dispensing apparatus 100 with base 107 covering the bottom of dispensing housing 101.

The user places cover 109 over the top of dispensing housing 101. Reference marker 503 illustrates the placement of cover 109 over the top of dispensing housing 101.

The user pushes the wider bottom lip of cover 109 onto and over coupler 105, thereby connecting or coupling cover 109 to dispensing housing 101 and sealing the top end of dispensing apparatus 100. Reference marker 505 illustrates dispensing apparatus 100 in the fully sealed state.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

The invention claimed is:

1. An apparatus comprising:
   a dispensing housing comprising:
      a rectangular body with a central cavity;
      an elongated opening about a first side of the rectangular body; and
      a pair of grippers about a second side and a third side of the rectangular body;
   a coupler attached to a bottom of the dispensing housing, the coupler comprising a flexible material that increases a width about the bottom of the dispensing housing;
   a base that couples to and decouples from the bottom of the dispensing housing via the coupler; and
   a cover that couples to and decouples from a top of the dispensing housing via the coupler.

2. The apparatus of claim 1, wherein the base comprises:
   a top end with an upward extending border; and
   a wider bottom end, wherein the top end of the base fits around the coupler and seals the bottom of the dispensing housing with the wider bottom end, and wherein the wider bottom end increases stability of the apparatus when the base is coupled to the dispensing housing and is used to retain the apparatus in a vertical position.

3. The apparatus of claim 2, wherein the cover comprises:
   a rectangular body that is larger than the rectangular body of the dispensing housing;
   a central cavity;
   a bottom opening that is sized proportionate to the dispensing housing; and
   a bottom lip that is sized to fit over and connect to the coupler, wherein the cover slides over the top of the dispensing housing with the bottom lip attaching to the coupler and sealing the top of the dispensing housing with the rectangular body of the cover.

4. The apparatus of claim 1 further comprising:
   a cap comprising a flat rigid material that fits inside the top of the dispensing housing, wherein the cap eliminates contact between a user finger and a stick placed inside the dispensing housing, and wherein the cap distributes a force applied by the user finger onto the cap evenly across a surface of the stick.

5. The apparatus of claim 1, wherein the dispensing housing further comprises:
a perforated cutting element, the perforated cutting element comprising a set of sharp or pointed edges that extend around a base of the rectangular body of the dispensing housing.

6. The apparatus of claim 1, wherein the dispensing housing is an injecting molded piece of plastic.

7. The apparatus of claim 1, wherein the elongated opening comprises:
an aperture that extends from a top of the first side of the rectangular body of the dispensing housing and that ends before the bottom of the first side of the rectangular body of the dispensing housing, and wherein the second side, the third side, and a fourth side of the rectangular body are solid and do not contain any openings.

8. The apparatus of claim 1, wherein the grippers comprise:
a set of tabs formed from partially cut sections about the second side and the third side of the rectangular body, wherein the set of tabs flex inwards towards the central cavity when an external force is applied, and flex to be parallel with the second side and the third side of the rectangular body when the external force is removed.

9. The apparatus of claim 1, wherein the coupler comprises a heat tolerant piece of silicon that extends around an exterior of the dispensing housing about the bottom of the dispensing housing.

10. An apparatus for dispensing a desired amount of a food product having a generally rectangular shape, the apparatus comprising:
a housing having the generally rectangular shape of the food product, the housing comprising:
a first open end that receives the food product into the housing;
a second open end through which the food product is dispensed;
an elongated opening on one surface, the elongated opening extending along the one surface starting from the first open end of the housing at least part way to the second open end of the housing;
a gripper disposed on each surface of the housing adjacent the one surface with the elongated opening, each particular gripper resisting movement of the food product through the housing in response to an application of pressure on that particular gripper; and
a coupler at the second open end of the housing;
a closed base shaped to receive the coupler and cover the second open end of the housing; and
a cover shaped to fit over the housing and cover the first open end of the housing and the elongated opening in the housing.

11. The apparatus of claim 10 further comprising a cap shaped to be received into the first open end of the housing and contact the food product while dispensing the food product.

12. The apparatus of claim 10, wherein the coupler fits around the second open end of the housing and creates a seal against the closed base when pressed against the closed base.

13. The apparatus of claim 12, wherein the coupler is a flexible sleeve.

14. The apparatus of claim 10, wherein the cover is shaped to engage the coupler and create a seal between the coupler and the cover in response to covering the first open end and the elongated opening by placing the cover over the housing.

15. The apparatus of claim 10, wherein the gripper comprises a flexible tab on the surface of the housing adjacent to the one surface.

16. The apparatus of claim 15, wherein the gripper is a partially cut section of the surface of the housing adjacent to the one surface.

\* \* \* \* \*